United States Patent
Cavanaugh et al.

(10) Patent No.: US 8,737,406 B1
(45) Date of Patent: May 27, 2014

(54) METHOD FOR TRANSMITTING IP ROUTES TO PRIORITIZE CONVERGENCE

(75) Inventors: John E. Cavanaugh, Raleigh, NC (US); Roy M. Brooks, New Hill, NC (US); Matthew H. Birkner, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 3282 days.

(21) Appl. No.: 10/210,163

(22) Filed: Aug. 1, 2002

(51) Int. Cl.
*H04L 12/28* (2006.01)
*H04L 12/56* (2006.01)
*H04L 29/06* (2006.01)

(52) U.S. Cl.
CPC .............. *H04L 65/00* (2013.01); *H04L 45/00* (2013.01); *H04L 45/02* (2013.01)
USPC ....................... 370/395.31; 370/351; 370/352

(58) Field of Classification Search
CPC . H04L 45/54; H04L 49/3009; H04L 12/5601; H04L 65/00; H04L 45/00; H04L 45/02; H04L 2012/64; H04L 12/64
USPC .................. 709/238, 242; 370/351, 352, 401, 370/395.31, 395.52, 389, 392
See application file for complete search history.

(56) References Cited

U.S. PATENT DOCUMENTS

| | | | |
|---|---|---|---|
| 5,519,704 A | | 5/1996 | Farinacci et al. |
| 5,964,841 A | | 10/1999 | Rekhter |
| 6,041,049 A | * | 3/2000 | Brady ............................ 370/351 |
| 6,097,718 A | | 8/2000 | Bion |
| 6,286,052 B1 | | 9/2001 | McCloghrie et al. |
| 6,327,251 B1 | | 12/2001 | Bion |
| 6,339,595 B1 | | 1/2002 | Rekhter et al. |
| 6,392,997 B1 | | 5/2002 | Chen |
| 6,393,486 B1 | | 5/2002 | Pelavin et al. |
| 6,412,007 B1 | | 6/2002 | Bui et al. |
| 6,412,077 B1 | | 6/2002 | Roden et al. |
| 6,553,031 B1 | * | 4/2003 | Nakamura et al. ............ 370/392 |
| 6,567,380 B1 | * | 5/2003 | Chen .............................. 370/238 |
| 6,744,774 B2 | * | 6/2004 | Sharma ......................... 370/401 |
| 6,778,498 B2 | * | 8/2004 | McDysan ...................... 370/231 |
| 6,857,026 B1 | * | 2/2005 | Cain .............................. 709/239 |
| 6,938,095 B2 | * | 8/2005 | Basturk et al. ................ 709/238 |
| 6,968,393 B1 | * | 11/2005 | Chen et al. .................... 709/242 |
| 7,565,448 B1 | * | 7/2009 | Schlesener et al. ........... 709/242 |

(Continued)

OTHER PUBLICATIONS

Rekhter, Y. et al., A Border Gateway Protocol 4 (BGP-4), Request for Comments (RFC) 1771, Network Working Group, Internet Engineering Task Force, http://www.ietf.org, Mar. 1995, pp. 1-57.

(Continued)

*Primary Examiner* — Chuong T Ho
(74) *Attorney, Agent, or Firm* — Novak Druce Connolly Bove + Quigg LLP

(57) ABSTRACT

An improved technique for distributing routing information that allows routes to be prioritized such that information associated with higher priority routes is sent in update messages ahead of information associated with lower priority routes, thereby enabling the higher priority routes to converge faster than the lower priority routes. In the preferred embodiment of the invention a route policy map that associates routes with priorities is defined. The policy map is then applied to the routes to prioritize the routes. Update messages are then generated using the priority information and the route information contained in the update messages is organized such that route information associated with higher priority routes is placed ahead of route information associated with lower priority routes.

30 Claims, 7 Drawing Sheets

(56) References Cited

U.S. PATENT DOCUMENTS

| | | | |
|---|---|---|---|
| 2002/0049561 A1* | 4/2002 | Garcia-Luna-Aceves et al. | 702/182 |
| 2003/0137974 A1* | 7/2003 | Kwan et al. | 370/352 |
| 2004/0001497 A1* | 1/2004 | Sharma | 370/401 |
| 2004/0210892 A1* | 10/2004 | Sharma | 717/168 |

OTHER PUBLICATIONS

Bates, T. et al., Multiprotocol Extensions for BGP-4, Request for Comments (RFC) 2858, Network Working Group, Internet Engineering Task Force, http://www.ietf.org, Jun. 2000, pp. 1-11.

* cited by examiner

METHOD FOR TRANSMITTING IP ROUTES TO PRIORITIZE CONVERGENCE

BACKGROUND OF THE INVENTION

1. Field of the Invention

This invention relates generally to computer networks and, more particularly, to distributing routing information associated with routing protocols used in a computer network.

2. Background Information

A computer network is a geographically distributed collection of interconnected communication links for transporting data between nodes, such as computers. Many types of computer networks are available, with the types ranging from Local Area Networks (LANs) to Wide Area Networks (WANs). The nodes typically communicate by exchanging discrete frames or packets of data according to pre-defined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as autonomous systems or routing domains. An autonomous system is defined as a set of routers under a single administrative authority, that use an interior gateway protocol (IGP) and common metrics to route packets within the autonomous system and an exterior gateway protocol (EGP) to route packets to other autonomous systems.

An IGP is a routing protocol that, inter alia, distributes routing information to the routers within an autonomous system. IGPs are often configured to calculate efficient routes and recalculate them quickly after certain events, such as a network topology change. Examples of IGPs include the Routing Internet Protocol (RIP), Open Shortest Path First (OSPF) and Enhanced Interior Gateway Routing Protocol (EIGRP). An EGP, on the other hand, is a routing protocol that, inter alia, distributes routing information to routers that interconnect autonomous systems. EGPs are typically configured to express particular routing policies and aggregate routing information associated with a collection of autonomous systems. Examples of an EGP is the Border Gateway Protocol (BGP) which is described in detail in A Border Gateway Protocol 4 (BGP-4), Request For Comments (RFC) 1771, by Y. Rekhter, et al., and the Multiprotocol BGP (MBGP), which is described in detail in Multiprotocol Extensions for BGP-4, Request For Comments (RFC) 2858, by T. Bates, et al., both of which are available from the Internet Engineering Task Force (IETF) at http://www.ietf.org and are hereby incorporated by reference as though fully set forth herein.

BGP is an Internet Protocol (IP) version 4 (IPv4) based inter-domain routing protocol that supports classless inter-domain routing, allows the aggregation of routes, and provides for policy-based routing. MBGP is an extension of BGP that supports other protocols in addition to IPv4 including IP version 6 (IPv6), IP Multicast, Virtual Private Network version 4 (VPNv4), and Virtual Private Network version 6 (VPNv6). Both BGP and MBGP use a reliable transport protocol, such as the Transmission Control Protocol (TCP), to distribute routing information in the form of update messages.

Routers running IGPs and EGPs are typically configured to maintain routing tables, transmit routing update messages and render routing decisions based on various routing metrics. Specifically, each router maintains routing information that lists routes or paths to particular destinations in the network. Periodic refreshing of the routing information occurs depending on the routing protocol. Moreover, routers residing in the autonomous systems exchange routing information under various circumstances. For example, when a BGP router initially connects to the network, the peer routers exchange the entire contents of their routing tables, which contain the routing information. Likewise when the topology of the network changes, routing tables often are recalculated and the contents of these recalculated tables are communicated to the peer routers through one or more update messages.

A network of routers is considered converged when all the routers in the network agree on the network's topology, i.e., the routers agree on the optimal routes to each destination in the network. Generally speaking, most IGPs are based on one of two types of distributed routing algorithms: link-state or distance vector. The routing information that is exchanged between peers and the method employed to reach convergence often depends on the type of distributed routing algorithm employed by the protocol.

Distance vector protocols, such as RIP, often include a vector (list) of distances (hop counts or other metrics) associated with a route in the routing information that is distributed. Moreover, distance vector protocols utilize a distributed computation approach to calculating the route to each destination; that is, each router separately calculates the best path to each destination. After selecting the best path, the router sends distance vectors to its neighbors to notify them of the reachability of the destination and the corresponding metrics associated with the path. The neighbors use this information, to calculate the best path to each of the destinations and then notify their neighbors of the available path they've selected to reach the destination. Upon the receipt of messages, the router might determine that a better path exists via an alternative neighbor. The router will again notify its neighbors of its selected paths to reach each destination. This cycle continues until all the routers have converged upon a common understanding of the best paths to reach each destination.

Link-state protocols, such as OSPF, utilize a replicated distributed database model to maintain link-state information. Link-state protocols work on the basis that routers exchange information elements, called link states, which carry information about links and nodes in the routing domain. Routers that run link-state protocols do not exchange routing tables as distance vectors protocols do. Rather, they exchange information about connections to adjacent neighbors and networks, and include metric information associated with each connection. Each router in the network generates the link state that describes it and its connections to the adjacent routers. The router also generates a list of metrics corresponding to the connection with each adjacent router. This information is then distributed by the router throughout the network in one or more update messages, often called Link State Advertisements (LSAs), until all routers in the routing domain have received the routing information from each of the other routers. Each router then uses the information to construct a routing table that represents all the routes for all the destinations in the routing domain.

EGP protocols, such as BGP and MBGP, on the other hand, often employ a path vector routing algorithm, which maintains a traceroute-like path vector that indicates how a route was created and propagated. These protocols often exchange routing information using a transport protocol such as the TCP protocol. A router running an EGP protocol typically exchanges routing information with its neighboring peer routers at start-up time. Periodic refreshing of the routing information, however, is generally not performed. The routing protocol may learn of multiple paths to the same destination from its peers and often chooses a path by selecting the best path among the multiple paths. The chosen path is then typically maintained in its routing information as the path to that destination.

In systems where the amount of routing information is quite large, a router may need to send a large number of packets in order to disseminate the routing information to other routers in the network. A router receiving these update messages often processes the routing information on a first-come-first-served basis; thus routing information received in earlier messages often converges ahead of routing information received in later messages. A system containing many thousands of routes may take on the order of minutes to completely converge, thus causing later transmitted routes to experience an inordinate amount of downtime due to convergence delays. In systems where network downtime is strictly governed, such as systems subject to Service Level Agreements (SLAs), such outages may be unacceptable.

SUMMARY OF THE INVENTION

The present invention incorporates an improved technique for distributing routing information that allows routes to be prioritized such that information associated with higher priority routes is sent in update messages ahead of information associated with lower priority routes, thereby enabling the higher priority routes to converge faster than the lower priority routes. The inventive technique may be employed in networks where it is desirable to have certain designated routes converge faster than other routes in order to lessen downtime for the designated routes that may be associated with a network topology change.

Briefly, in the illustrative embodiment of the invention, a route policy map that associates routes with priorities is applied to the routes to prioritize the routes. Update messages are then generated using the priority information and the route information contained in the update messages is organized such that route information associated with higher priority routes is placed ahead of route information associated with lower priority routes across all the update messages.

The inventive technique represents an improvement over existing techniques by providing control over the order in which routes are sent in update messages, thus, enabling faster convergence for certain designated routes. Advantageously, the inventive technique provides flexibility in meeting certain network availability requirements that may be set out in a Service Level Agreement (SLA) in that routes associated with an SLA can be designated as higher priority routes and thereby converge faster than routes not subject to the SLA.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
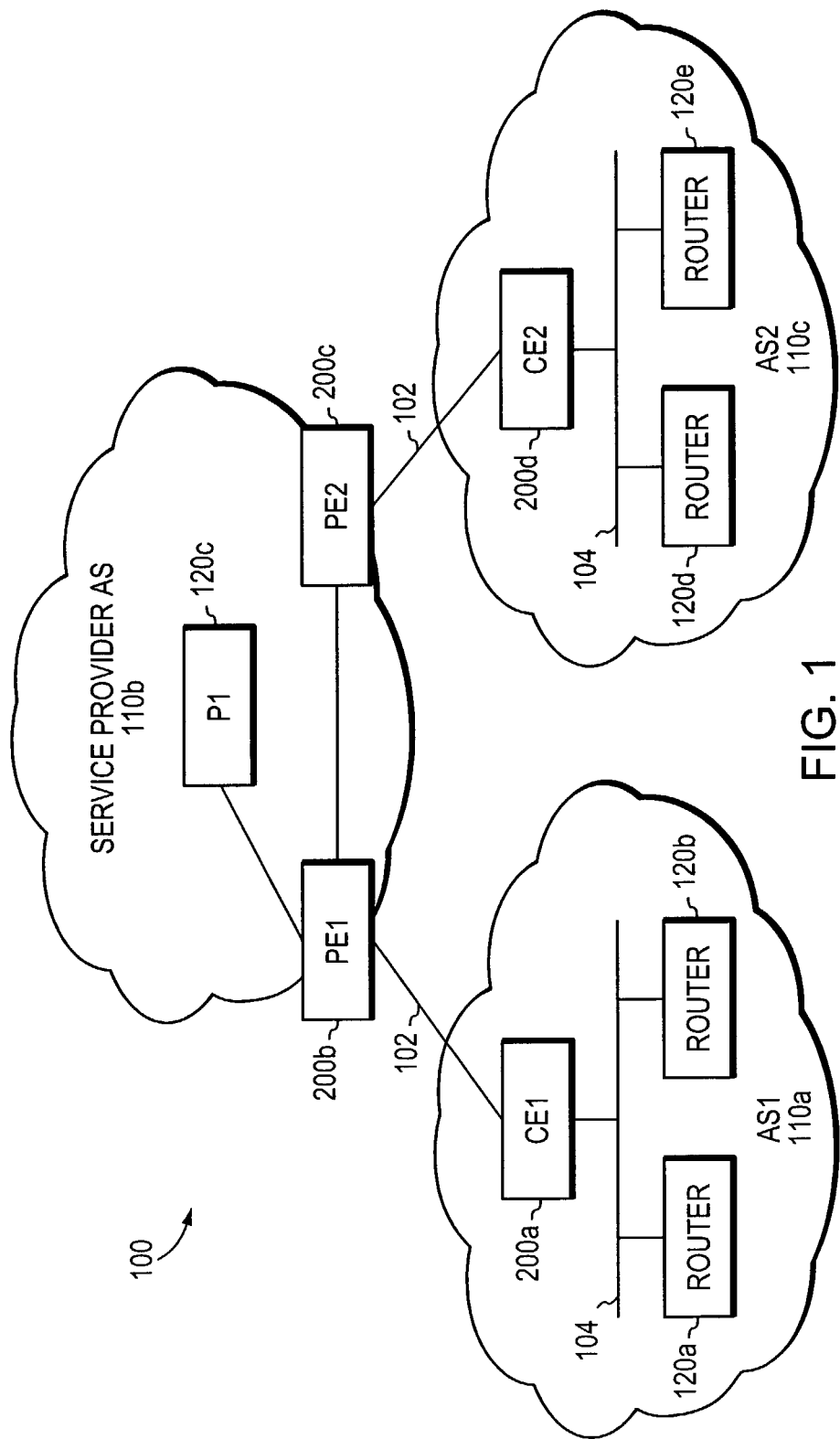
FIG. 1 is a schematic block diagram of a computer network that may be advantageously used with the present invention.

FIG. 1 is a schematic block diagram of an exemplary computer network 100 that may be advantageously used with the present invention. The computer network 100 comprises a plurality of autonomous systems or routing domains interconnected by intermediate nodes, such as conventional intra-domain routers 120 and interdomain routers 200. The autonomous systems include an Internet Service Provider (ISP) domain 110b and various customer domains including routing domains AS1 110a and AS2 110c interconnected by the interdomain routers 200. The interdomain routers 200 are interconnected by point-to-point links 102, such as frame relay links, asynchronous transfer mode (ATM) links or other data communications links. Communication among the routers is typically effected by exchanging discrete data frames or packets in accordance with pre-defined protocols, such as the Internet Protocol version 4 (IPv4) or the Transmission Control Protocol/Internet Protocol (TCP/IP). It will be understood to those skilled in the art that other protocols, such as the Internet Protocol version 6 (IPv6), Virtual Private Network version 4 (VPNv4) or Virtual Private Network version 6 (VPNv6), may be advantageously used with the present invention.

Figure 2:
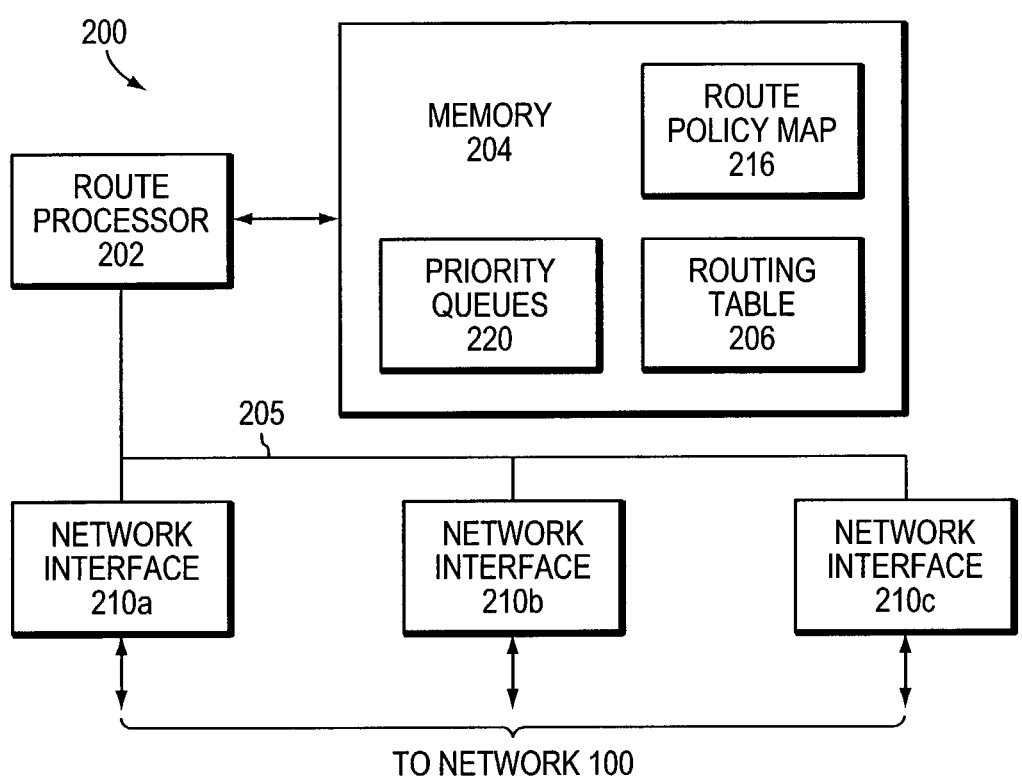
FIG. 2 is a schematic block diagram of a router that can advantageously implement the present invention.

Each router typically comprises a plurality of interconnected elements, such as a processor, a memory and a network interface adapter. FIG. 2 is a schematic block diagram of an interdomain router 200 comprising a route processor 202 coupled to a memory 204 and a plurality of network interface adapters 210a-c via a bus 205. The memory 204 may comprise storage locations addressable by the processor and interface adapters for storing software programs and data structures associated with the inventive technique. The route processor 202 may comprise processing elements or logic for executing the software programs and manipulating the data structures. An operating system, portions of which are typically resident in memory 204 and executed by the route processor 202, functionally organizes the router 200 by, inter alia, invoking network operations in support of software processes executing on the router. It will be apparent to those skilled in the art that other processor and memory means, including various computer readable media, may be used for storing and executing program instructions pertaining to the inventive technique described herein.

Figure 3:
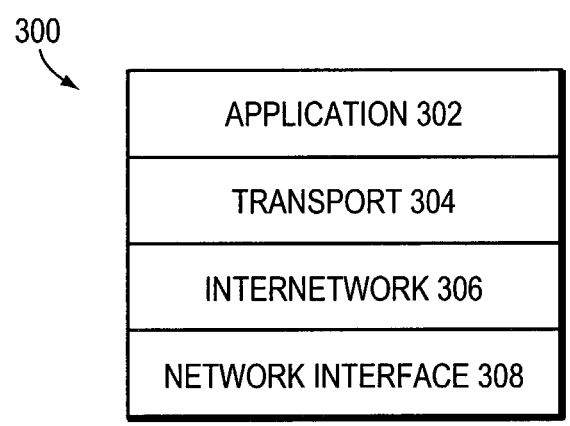
FIG. 3 is a schematic block diagram of a conventional protocol stack, such as the Internet communications protocol stack.

A key function of the interdomain router 200 is determining the next node to which a packet is sent. In order to accomplish such "routing," the interdomain routers 200 cooperate to determine optimal paths (routes) through the computer network 100. The routing function is preferably performed by an internetwork layer of a conventional protocol stack within each router. FIG. 3 is a schematic block diagram of a conventional protocol stack, such as the Internet communications protocol stack. Stack 300 is represented by four layers, a network interface layer 308, the internetwork layer 306, a transport layer 304, and an application layer 302.

The lower network interface layer 308 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote the Internet architecture.

In particular, the internetwork layer 306 concerns the protocol and algorithms that interdomain routers 200 utilize so that they can cooperate to calculate paths through the computer network 100. An interdomain routing protocol, such as the Multiprotocol Border Gateway Protocol (MBGP), is used to perform interdomain and intradomain routing (for the internetwork layer) through the computer network 100. Both the interdomain routers 200 and intradomain routers 120 exchange routing and reachability information with their neighbor or peer routers (hereinafter "neighboring peer routers") over a reliable transport layer connection, such as TCP. The MBGP protocol "runs" on top of the transport layer to ensure reliable communication among the neighboring peer routers.

In order to perform routing operations in accordance with the MBGP protocol, each interdomain router 200 maintains a routing table 206 that lists all feasible paths to a is particular network within an autonomous system. The routers further exchange routing information using routing update messages. The routing update messages are generated by an updating router to advertise optimal paths to each of its neighboring peer routers throughout the computer network. These routing updates allow the MBGP routers of the autonomous systems to construct a consistent and up-to-date view of the network topology.

Figure 4:
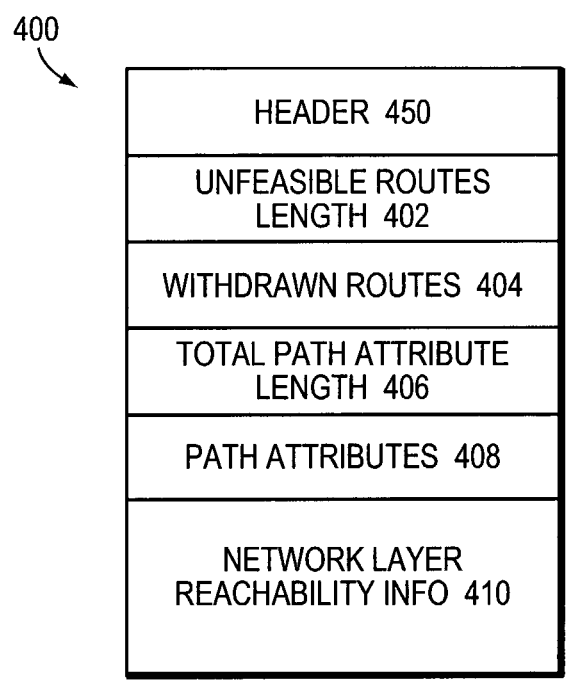
FIG. 4 is a schematic block diagram of a conventional update message, such as a Multiprotocol Border Gateway Protocol (MBGP) update message, which may be advantageously used with the present invention.

FIG. 4 is a schematic block diagram of a conventional MBGP update message 400 comprising a plurality of fields appended to a header 450. An unfeasible routes length field 402 indicates the total length of a withdrawn routes field 404, which contains a list of IP address prefixes for the routes being withdrawn from service. A total path attribute length field 406 indicates the total length of a path attributes field 408 and a network layer reachability information (NLRI) field 410 contains a list of routing information in the form address prefixes. The format and function of update message 400 is described in RFC 1771 and RFC 2858.

Figure 5:
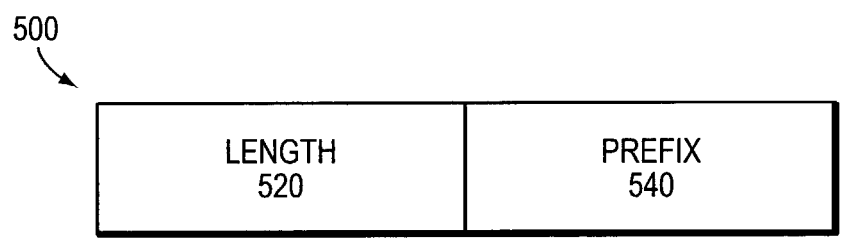
FIG. 5 is a schematic block diagram of a Network Layer Reachability Information (NLRI) entry that may be used with the present invention.

Specifically, the NLRI field 410 comprises a list that contains one or more NLRI entries 500 (FIG. 5) where each entry lists an address prefix of a known destination about which router 200 is trying to inform its neighboring peer routers. FIG. 5 is a block diagram of an NLRI entry 500 comprising a length field 520 and a prefix field 540. The prefix field 540 contains the address prefix of the known destination. The length field 520 indicates the number of bits (left to right) that constitute the network number in the address prefix.

In accordance with the present invention, an improved routing update technique is provided that allows routing information associated with higher priority routes to be distributed ahead of routing information associated with lower priority routes, thereby enabling the higher priority routes to converge faster than the lower priority routes. The inventive technique may be employed in networks where it is desirable to have certain designated routes converge faster than other routes in order to lessen the downtime for the designated routes due to convergence delays.

Figure 6:
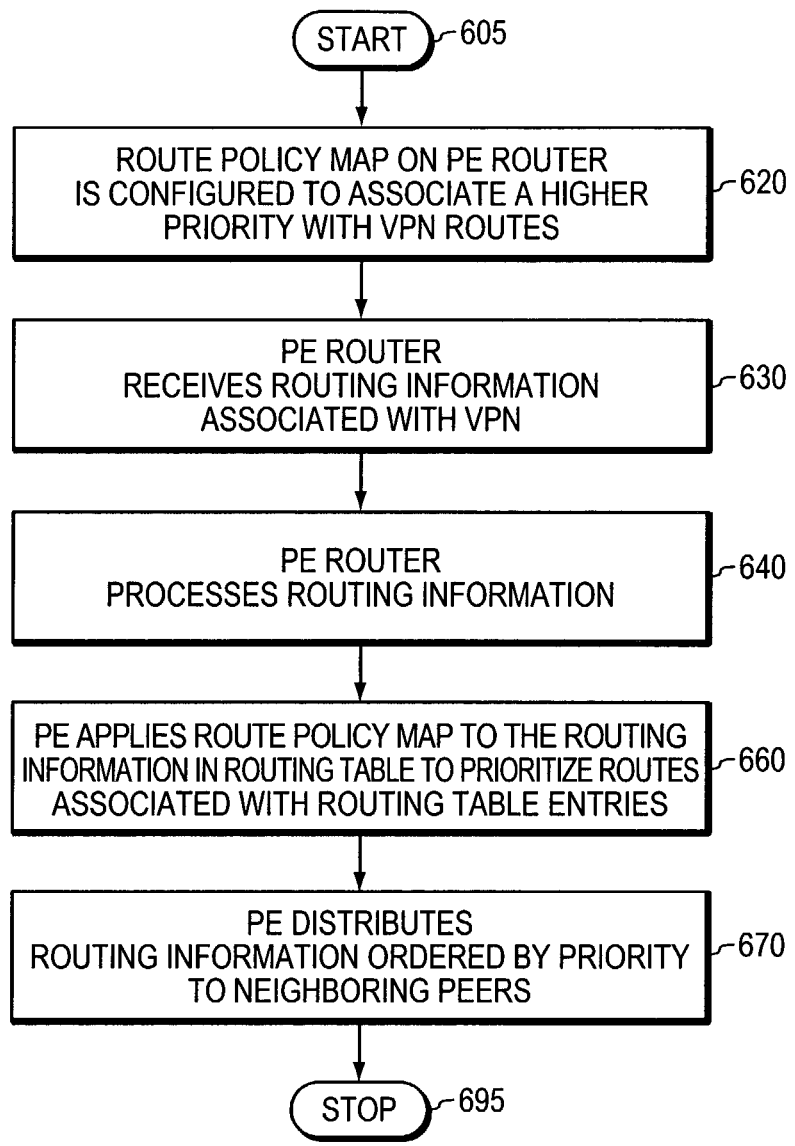
FIG. 6 is a flow diagram of a sequence of steps that may be used to implement the present invention.

Assume a customer wishes to operate a Virtual Private Network (VPN) between autonomous systems AS1 and AS2 through the service provider's autonomous system 110b and that an SLA between the customer and service provider controls the amount of downtime for routes associated with the VPN. Further suppose that the service provider has determined that the requirements of the SLA can be met provided that routing information associated with the VPN is sent ahead of other routing information contained in the service provider's edge routers PE1 200b and PE2 200c. FIG. 6 is a flow diagram of a sequence of steps that may be implemented on routers PE1 and PE2 to distribute routing information associated with the VPN routes ahead of other routes in accordance with the inventive technique.

Figure 7:
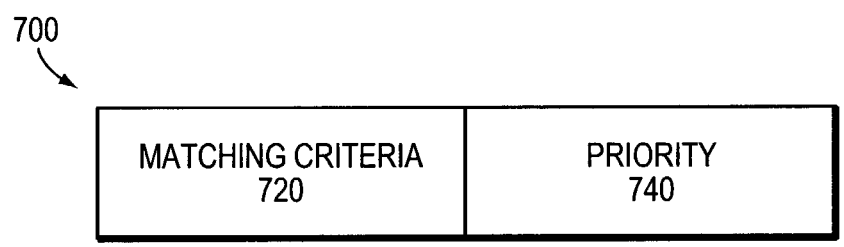
FIG. 7 is a schematic block diagram of a routing policy table entry that may be used with the present invention.

The sequence begins at Step 605 and proceeds to Step 620 where a route policy map 216 is configured to designate that the routes associated with the VPN are to be given a higher priority than all other routes. Map 216 contains one or more entries 700 where each entry associates a particular route with a particular priority. FIG. 7 is a block diagram of a route policy-map entry 700. Entry 700 comprises a matching criteria field 720 that illustratively designates a destination associated with a route preferably in the form of an address prefix. A priority field 740 designates a priority associated with the route. To associate a particular priority with a particular route, a user enters a series of commands into router 200 that specify an address prefix and priority associated with the route. In response, router 200 creates an entry 700 in its route policy map 216 and places the prefix and priority values in the matching criteria 720 and priority 740 fields of the new entry, respectively.

Next at Step 630, router PE1 200b receives the routing information associated with the VPN from neighboring peer router CE1 200a, preferably in the form of one or more update messages. Router PE1 200b then processes each route contained in the messages as indicated at Step 640. Specifically, router PE1 200b determines if the route associated with the NLRI entry 500 is represented in its routing table 206 and if not generates a routing-table entry 800 and places the route information into the entry 800.

Figure 8:
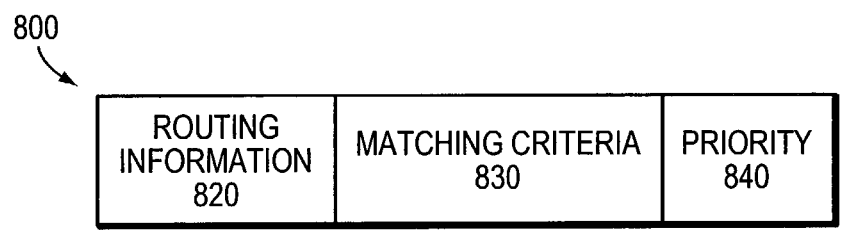
FIG. 8 is a routing-table entry in accordance with the present invention.

FIG. 8 is a block diagram of a typical routing-table entry 800 in accordance with the present invention. Entry 800 comprises a matching criteria field 830 that illustratively designates a destination associated with a route preferably in the form of an address prefix, a routing information field 820 that contains various routing information associated with the route, such as next-hop information, aging information, status and so on, and a priority field 840 that contains a priority associated with the route. In this context, a route is considered represented in the routing table 206 if the prefix information 540 contained in the entry 500 matches the prefix information contained in the matching criteria 830 of an entry 800 in the routing table 206. If the route is not represented, router PE1 200b processes the NLRI entry 500 by placing the value contained in the prefix 540 field of the NLRI entry into the matching criteria field 830 of the generated entry 800 and setting the routing information field 820, as necessary.

Referring again to FIG. 6 and, in particular, Step 660, PE1 200b then applies the policy map 216 to the routing information contained in the routing table 206 to prioritize the routes contained in the table 206. Specifically, for each routing-table entry 800, PE1 200*b* compares the prefix value contained in the routing-table entry to the prefix values contained in the policy-map entries. If a matching entry is found PE1 200*b* places the priority information 740 contained in the matching entry 700 into the priority field 840, thereby "binding" the route associated with the routing-table entry with the priority specified in the matching policy-map entry.

At Step 670, PE1 200*b* then distributes the routing information to each of its neighboring peer routers, i.e., routers 200*a*, 200*c*, and 120*c*, preferably using one or more update messages 400 where the routing information contained in the update messages is ordered based on the priority associated with each route. In particular, PE1 200*b* examines the priority field 840 of each entry 800 in its routing table 206, and places route information entries 500 for those routes associated with a higher priority ahead of route information entries associated with lower priority routes in the update messages. Thus both within a message and across all messages, routing information associated with the highest priority routes is placed ahead of routing information associated with the next lower priority routes, and so on.

For example, assume routing table 206 contains seven entries that are associated with the above-described VPN and three entries that are not associated with the VPN. Further assume that each update message can hold up to five route information entries 500. In accordance with the inventive technique, a first update message is sent containing route information entries that represent the first five VPN routes followed by a second update message that contains route information entries representing the remaining two VPN routes followed by entries 500 representing the three non-VPN routes.

The above-described sequence of steps is performed on every router in the service provider's autonomous system that is included in the path between the AS1 110*a* and AS110*b*. Thus for example, the above-described sequence of steps is performed on PE2 200*c*. Specifically, at Step 630, PE2 200*c* receives the routing information associated with the VPN from router PE1 200*a*. Steps 640 through 695 are then performed as described above. The sequence then ends at Step 695.

Although the above-described embodiment of the invention sets forth the invention as is implemented on interdomain routers, i.e., service provider's edge routers, this is not intended to be a limitation of the invention. Rather the inventive technique can be implemented on other routers, such as intradomain routers or routers not included in an autonomous system.

It should be further noted that although the above-described embodiment of the invention sets forth the invention as used with MBGP, this too is not intended to be a limitation of the invention. Rather, the inventive technique could be applied to other protocols that exchange route information, such as the BGP, RIP or OSPF routing protocols.

Also in the above-described embodiment of the invention, the matching criteria that is used to associate a routing-table entry with a priority is an address prefix; however, this is not intended to be a limitation of the invention. In other embodiments of the invention, the matching criteria used to establish this association may assume some other form of routing information, such as an address family. For example, in one embodiment of the invention, the routing policy map may contain an address family tuple and a priority tuple. Moreover, each routing-table entry may be associated with a particular address family. In accordance with the inventive technique, routes associated with a particular address family listed in the routing policy map are associated with the priority associated with the address family.

Likewise in yet another embodiment of the invention, routes from a neighboring peer router are associated with a particular priority. This association could be established using a route policy-map entry or through a message received from the neighboring peer router that contains the priority information. For example, in accordance with BGP, neighbor negotiation is based on the successful completion of a TCP connection between the neighbors and the successful transmission and processing of an OPEN message. In one embodiment of the invention, the OPEN message contains the priority information.

Figure 9:
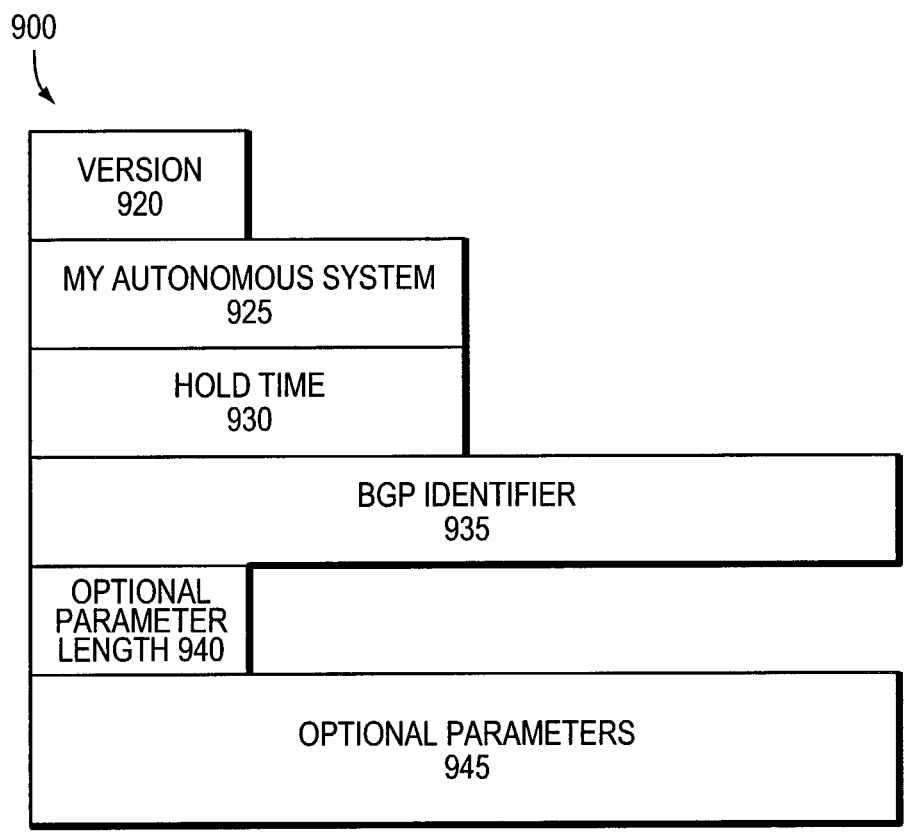
FIG. 9 is a schematic block diagram of a BGP OPEN message that can be used with the present invention.

FIG. 9 is a block diagram of an OPEN message 900 in accordance with the BGP protocol. Message 900 comprises a version field 920 that holds the version of the message, and an autonomous system field 925 that holds the autonomous system number of the sender. A hold time field 930 holds the maximum amount of time that may elapse between the receipt of various messages, and a BGP identifier field 935 identifies the message sender. In addition, the OPEN message comprises an optional parameter length field 940, and an optional parameters field 945. The optional parameter length field 940 and the optional parameters field 945 hold the total length of the optional parameters and a list of optional parameters, respectively. In accordance with this embodiment of the invention, the neighboring peer router sends an OPEN message to the intermediate node where the optional parameters field 945 contains a value that represents the priority associated with routing information received from the neighboring peer router. The intermediate node processes the message and, in turn, associates all routes received from that neighboring peer router with the priority represented in the message.

In another embodiment of the invention, the routing information is sent using a plurality of queues 220 (FIG. 2) organized by priority, such that information contained on a higher priority queue is sent ahead of information contained on a lower priority queue. In this embodiment, the queues 220 are contained in memory 204 although one skilled in the art would appreciate that the queues 220 can be implemented in other forms, such as forms that employ various combinations of combinatorial and sequential logic. The routing information is prioritized as described above and each route is further associated with a particular queue. This association is established using a user-configurable map that maps a particular priority associated with a route to a particular queue. It should be noted, though, that other forms could be used to establish this association, such as a field contained in the routing-table entry that holds a value that represents the associated queue. Each update message is created as described above wherein the only routes contained in each message are routes associated with a particular queue. The messages are then sent by placing each message on the particular queue associated with the routes contained in the message.

It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for distributing routing information maintained within a router in a computer network, the method comprising the steps of:

associating a plurality of routes contained in the routing information with a priority;

placing the plurality of routes in one or more update messages according to a specific order that is based on their associated priority such that higher priority routes are placed ahead of lower priority routes within the one or more update messages; and sending the one or more update messages to one or more neighboring peer routers.

2. The method as defined in claim 1 wherein the routing information is contained in a routing table comprising one or more routing-table entries and wherein each routing-table entry contains a route.

3. The method as defined in claim 2 wherein the step of associating further comprises the steps of:

applying a policy map comprising one or more policy-map entries to the routing information to determine if a policy-map entry matches a routing-table entry; and when a matching policy-map entry is found, associating a priority contained in the matching policy-map entry with the route contained in the matching routing-table entry.

4. The method as defined in claim 3 further comprising the step of generating the policy map.

5. The method as defined in claim 3 wherein the step of applying further comprises:

comparing one or more matching criteria contained in the policy-map entry to one or more matching criteria contained the routing-table entry; and when the matching criteria in the policy-map entry equal the matching criteria in the routing-table entry, concluding that the policy-map entry matches the routing-table entry.

6. The method as defined in claim 5 wherein each of the matching criteria in the policy-map entry and the matching criteria in the routing-table entry is an address prefix.

7. The method as defined in claim 5 wherein each of the matching criteria in the policy-map entry and the matching criteria in the routing-table entry is an address family.

8. The method as defined in claim 1 further comprising the step of receiving a message from a neighboring peer router wherein the message contains a value that represents a priority.

9. The method as defined in claim 8 wherein the message is a border gateway protocol OPEN message.

10. The method as defined in claim 8 wherein the step of associating further comprises the steps of:

receiving routes from the neighboring peer router; and associating the received routes with the priority represented by the value.

11. The method as defined in claim 1 further comprising the step of associating each route with a queue.

12. The method as defined in claim 11 wherein the routes contained in each update message are associated with a particular queue.

13. The method as defined in claim 12 wherein the step of sending further comprises the step of placing each update message on the particular queue.

14. An apparatus for distributing routing information comprising:

a memory containing routing information; and a processor coupled to the memory and configured to associate a plurality of routes contained in the routing information with a priority, the processor configured to place the plurality of routes in one or more update messages in a specific order that is based on the priorities of the plurality of routes such that higher priority routes are placed ahead of lower priority routes within the one or more update messages, the processor further configured to send the one or more update messages to a neighboring peer router.

15. The apparatus as defined in claim 14 further comprising:

a routing table containing one or more routing-table entries wherein each entry contains a route; and a policy map comprising one or more policy-map entries;

wherein the processor is further configured to apply the policy map to the routing table to determine if a policy-map entry matches a routing-table entry, and if a matching entry is found, associate a priority contained in the matching policy-map entry with the route contained in the matching routing-table entry.

16. The apparatus as defined in claim 15 wherein the processor is further configured to compare one or more matching criteria contained in the policy-map entry to one or more matching criteria contained the routing-table entry and conclude the policy-map entry matches the routing-table entry, when the matching criteria in the policy-map entry equal the matching criteria in the routing-table entry.

17. The apparatus as defined in claim 14 further comprising a plurality of queues, wherein the processor is configured to place routes associated with a particular queue in an update message and place the update message on the particular queue.

18. An apparatus for distributing routing information maintained within a router, the apparatus comprising:

means for associating a plurality of routes contained in the routing information with a priority;

means for placing the plurality of routes in one or more update messages in a specific order that is based on the priorities of the plurality of routes such that higher priority routes are placed ahead of lower priority routes within the one or more update messages; and means for sending the one or more update messages to a neighboring peer router.

19. The apparatus as defined in claim 18 wherein the routing information is contained in a routing table comprising one or more routing-table entries and wherein each routing-table entry contains a route, the apparatus further comprising:

means for applying a policy map comprising one or more policy-map entries to the routing information to determine if a policy-map entry matches a routing-table entry; and means for associating a priority contained in the matching policy-map entry with the route contained in the matching routing-table entry.

20. The non-transitory computer readable media comprising computer executable instructions, the computer executable instructions executed by a processor for:

associating a plurality of routes contained in the routing information maintained within a router with a priority;

placing the plurality of routes in one or more update messages in a specific order that is based on the priorities of the plurality of routes such that higher priority routes are placed ahead of lower priority routes within the one or more update messages; and sending the one or more update messages to a neighboring peer router.

21. The non-transitory computer readable media of claim 20, wherein the routing information is contained in a routing table comprising one or more routing-table entries and wherein each routing-table entry contains a route.

22. The non-transitory computer readable media of claim 20, wherein the computer executable instructions are further executed for:

applying a policy map comprising one or more policy-map entries to the routing information to determine that a policy-map entry matches a routing-table entry; and when a matching policy-map entry is found, associating a priority contained in the matching policy-map entry with the route contained in the matching routing-table entry.

23. The non-transitory computer readable media of claim 22, wherein the computer executable instructions are further executed for generating the policy map.

24. The non-transitory computer readable media of claim 20, wherein the computer executable instructions are further executed for:

comparing one or more matching criteria contained in the policy-map entry to one or more matching criteria contained the routing-table entry; and when the matching criteria in the policy-map entry equal the matching criteria in the routing-table entry, concluding that the policy-map entry matches the routing-table entry.

25. The non-transitory computer readable media of claim 24, wherein each of the matching criteria in the policy-map entry and the matching criteria in the routing-table entry is an address prefix.

26. The non-transitory computer readable media of claim 24, wherein each of the matching criteria in the policy-map entry and the matching criteria in the routing-table entry is an address family.

27. The non-transitory computer readable media of claim 20, wherein the computer executable instructions are further executed for receiving a message from a neighboring peer router wherein the message contains a value that represents a priority.

28. The non-transitory computer readable media of claim 20, wherein the message is a border gateway protocol OPEN message.

29. The non-transitory computer readable media of claim 20, wherein the computer executable instructions are further executed for:

receiving routes from the neighboring peer router; and associating the received routes with the priority represented by the value.

30. The non-transitory computer readable media of claim 20, wherein the computer executable instructions are further executed for associating each route with a queue.

\* \* \* \* \*